United States Patent
Khatri et al.

(10) Patent No.: US 11,330,109 B2
(45) Date of Patent: May 10, 2022

(54) USER EQUIPMENT-ASSISTED SECURE CALL TRANSFERS

(71) Applicant: QUALCOMM Incorporated, San Diego, CA (US)

(72) Inventors: Shrawan Khatri, San Diego, CA (US); Cherng-Shung Hsu, San Diego, CA (US); Vikram Singh, San Diego, CA (US); Aditya Reddy Muddasani, San Diego, CA (US); Changkun Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/006,583

(22) Filed: Aug. 28, 2020

(65) Prior Publication Data

US 2022/0070298 A1 Mar. 3, 2022

(51) Int. Cl.
*H04M 3/56* (2006.01)
*H04W 36/00* (2009.01)
*H04W 36/32* (2009.01)

(52) U.S. Cl.
CPC ......... *H04M 3/56* (2013.01); *H04W 36/0027* (2013.01); *H04W 36/32* (2013.01)

(58) Field of Classification Search
CPC .... H04M 3/56; H04W 36/0027; H04W 36/32
See application file for complete search history.

(56) References Cited

U.S. PATENT DOCUMENTS

| 9,496,971 | B2* | 11/2016 | Edge | H04W 40/246 |
| 2009/0296913 | A1* | 12/2009 | Thomas | H04M 3/42348 |
| | | | | 379/211.02 |
| 2014/0274006 | A1* | 9/2014 | Mutya | H04L 12/1827 |
| | | | | 455/416 |

OTHER PUBLICATIONS

3rd Generation Partnership Project; Technical Specification Group Core Network and Terminals; Explicit Communication Transfer {ECT} using IP Multimedia {IM} Core Network {CN} subsystem; Sep. 2009, 3GPP TS 24.629 V9.0.0. (Year: 2009).*

* cited by examiner

*Primary Examiner* — Tejis Daya
(74) *Attorney, Agent, or Firm* — Norton Rose Fulbright LLP

(57) ABSTRACT

Techniques described provide for transferring calls between a first user equipment (UE) and a second UE. One implementation may include receiving a request to transfer a call, which has been established between the first UE and a third party device, to be between a second UE and the third party device. Location information for the first and second UEs may be received. A determination may be made to determine whether the first and second UE are in proximity to each other. In the event that a determination is made that the first and second UE are in proximity to each other, the established call may be transferred from the first UE to the second UE. Other aspects and features are also claimed and described.

30 Claims, 9 Drawing Sheets

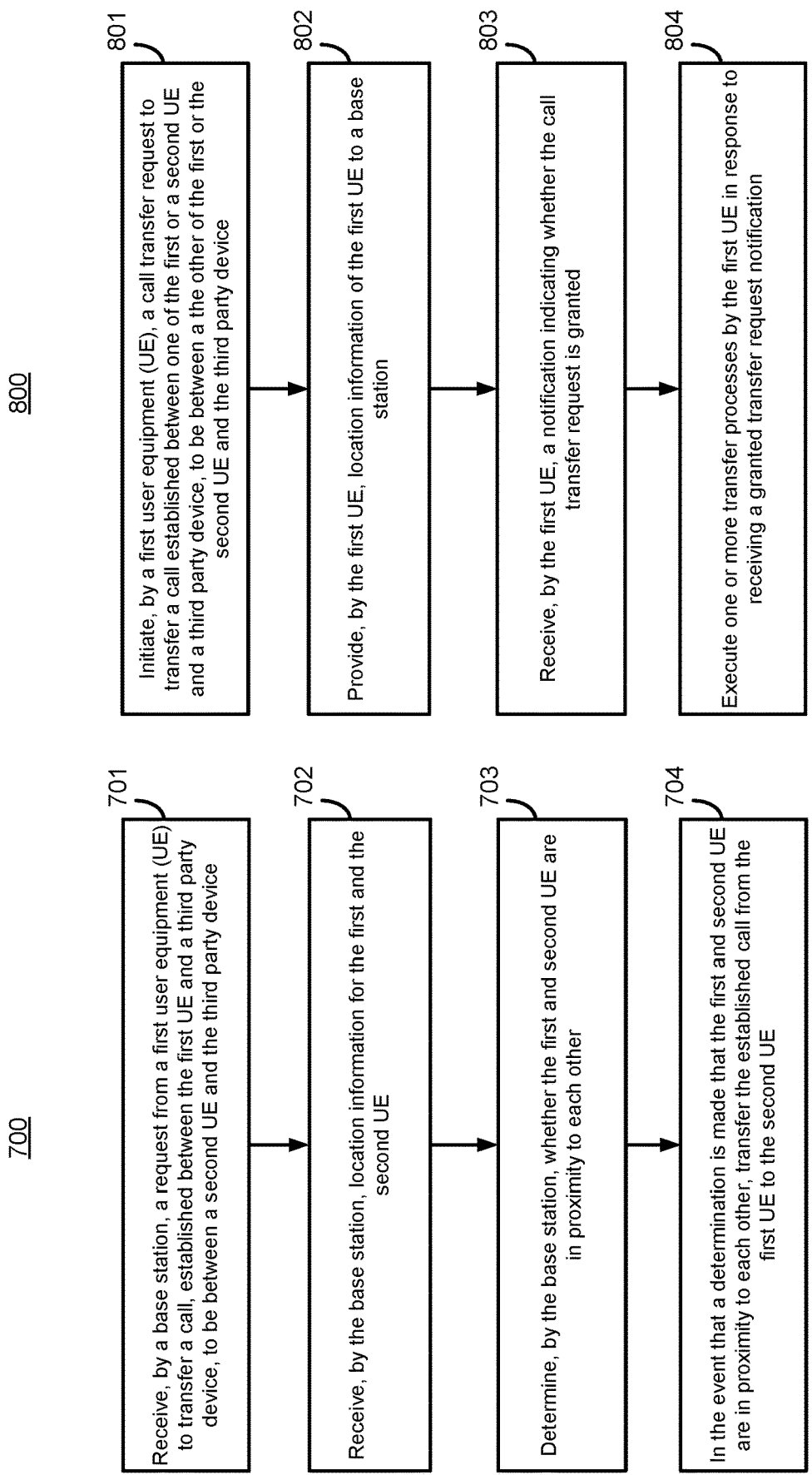

USER EQUIPMENT-ASSISTED SECURE CALL TRANSFERS

TECHNICAL FIELD

Aspects of the present disclosure relate generally to wireless communication systems, and more particularly, to systems and methods for securely transferring a live call between wireless devices.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

One area of enhancement is found with the advent of vehicles being manufactured with built in modem capabilities. Such vehicles may have advantages over a typical phone device as they often are equipped with better antennae and audio systems. Because of this, systems are being adapted to allow an active call to be transferred between a phone and a vehicle having separate data connections in a network. The ability to transfer such a call, however, can create various security vulnerabilities for the wireless network.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. A method may include receiving, by a base station, a request from a first user equipment (UE) to transfer a call, established between the first UE and a third party device, to be between a second UE and the third party device. The base station may further receive location information for the first and the second UE. The method may also include determining, by the base station, whether the first and second UE are in proximity to each other. In the event that a determination is made that the first and second UE are in proximity to each other, the method may transfer the established call from the first UE to the second UE.

In an additional aspect of the disclosure, an apparatus configured for wireless communication is provided. An apparatus may include a means for receiving a request from a first user equipment (UE) to transfer a call, established between the first UE and a third party device, to be between a second UE and the third party device. An apparatus may also include a means for receiving location information for the first and the second UE. Further, an apparatus may include a means for determining whether the first and second UE are in proximity to each other. In the event that a determination is made that the first and second UE are in proximity to each other, an apparatus may include a means for transferring the established call from the first UE to the second UE.

In an additional aspect of the disclosure, a non-transitory computer-readable medium having program code recorded thereon is provided. Program code may include code to receive a request from a first user equipment (UE) to transfer a call, established between the first UE and a third party device, to be between a second UE and the third party device. Program code may also include code to receive location information for the first and the second UE. Further, program code may include code to determine whether the first and second UE are in proximity to each other. In the event that a determination is made that the first and second UE are in proximity to each other, program code may include code to transfer the established call from the first UE to the second UE.

In an additional aspect of the disclosure, an apparatus configured for wireless communication is disclosed. The apparatus includes at least one processor, and a memory coupled to the processor. A processor may be configured to receive a request from a first user equipment (UE) to transfer a call, established between the first UE and a third party device, to be between a second UE and the third party device. A processor may also receive location information for the first and the second UE. A processor may also be configured to determine whether the first and second UE are in proximity to each other. In the event that a determination is made that the first and second UE are in proximity to each other, a processor may also be configured to transfer the established call from the first UE to the second UE.

In accordance with aspects of the disclosure, the foregoing systems, methods, and apparatuses may be implemented in combination with one or more additional features, such as the following features whether alone or in combination. For example, the above systems, methods, and apparatuses may be implemented where the call established between the first UE and the third party device is established using an Internet Protocol connection. The above systems, methods, and apparatuses may include a feature where a base station utilizes session initiation protocol signaling to transfer the established call from the first UE to the second UE. The above systems, methods, and apparatuses may be implemented where the location information for the first and second UE includes global positioning system (GPS) location information. The above systems, methods, and apparatuses may include a feature where determining that the first and second UE are in proximity to each other includes determining that the first and second UE are within fifteen meters of each other. The above systems, methods, and apparatuses may be implemented where the request from the first UE is a push request to push the established call from the first UE to the second UE and/or where the request from the first UE is a pull request to pull the established call to the first UE from the second UE.

In one aspect of the disclosure, a method of wireless communication is provided. A method may include initiating, by a first user equipment (UE), a call transfer request to transfer a call established between one of the first or a second UE and a third party device, to be between a the other of the first or the second UE and the third party device. A method may also include providing, by the first UE, location information of the first UE to a base station. A method may further include receiving, by the first UE, a notification indicating whether the call transfer request is granted. Additionally, a method may include executing one or more transfer processes by the first UE in response to receiving a granted transfer request notification.

In an additional aspect of the disclosure, an apparatus configured for wireless communication is provided. An apparatus may include a means for initiating a call transfer request to transfer a call established between one of the first or a second UE and a third party device, to be between a the other of the first or the second UE and the third party device. An apparatus may also include a means for providing location information of the first UE to a base station. An apparatus may further include a means for receiving a notification indicating whether the call transfer request is granted. Additionally, an apparatus may include a means for executing one or more transfer processes in response to receiving a granted transfer request notification.

In an additional aspect of the disclosure, a non-transitory computer-readable medium having program code recorded thereon is provided. Program code may include code to initiate a call transfer request to transfer a call established between one of the first or a second UE and a third party device, to be between a the other of the first or the second UE and the third party device. Program code may further include code to provide location information of the first UE to a base station. Program code may include code to receive a notification indicating whether the call transfer request is granted. Additionally, program code may include code to execute one or more transfer processes in response to receiving a granted transfer request notification.

In an additional aspect of the disclosure, an apparatus configured for wireless communication is provided. The apparatus includes at least one processor, and a memory coupled to the processor. A processor may be configured to initiate a call transfer request to transfer a call established between one of the first or a second UE and a third party device, to be between the other of the first or the second UE and the third party device. A processor may also be configured to provide location information of the first UE to a base station. A processor may be further configured to receive a notification indicating whether the call transfer request is granted. Additionally, a processor may be configured to execute one or more transfer processes in response to receiving a granted transfer request notification.

In accordance with aspects of the disclosure, the foregoing systems, methods, and apparatuses may be implemented in combination with one or more additional features, such as the following features whether alone or in combination. For example, the above systems, methods, and apparatuses may include a feature where the call transfer request is a pull request to pull a call established between the second UE and the third party device to be between the first UE and the third party device. The above systems, methods, and apparatuses may include a feature where conducting one or more transfer processes includes receiving and facilitating the pulled call by the first UE. The above systems, methods, and apparatuses may include a feature where the call transfer request is a push request to push a call established between the first UE and the third party device, to be between the second UE and the third party device. The above systems, methods, and apparatuses may include a feature where conducting one or more transfer processes includes disconnecting the established call by the first UE. The above systems, methods, and apparatuses may include a feature where location information is provided by the first UE with the call transfer request. The above systems, methods, and apparatuses may include a feature where the location information is provided by the first UE to the base station in response to receiving a request from the base station. The above systems, methods, and apparatuses may include a feature where the location information provided by the first UE includes global positioning system (GPS) information.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 7 and 8 show flow diagrams of operation by devices in a wireless network facilitating proximity-based call transfers according to some embodiments of the present disclosure.

DETAILED DESCRIPTION

Figure 1:
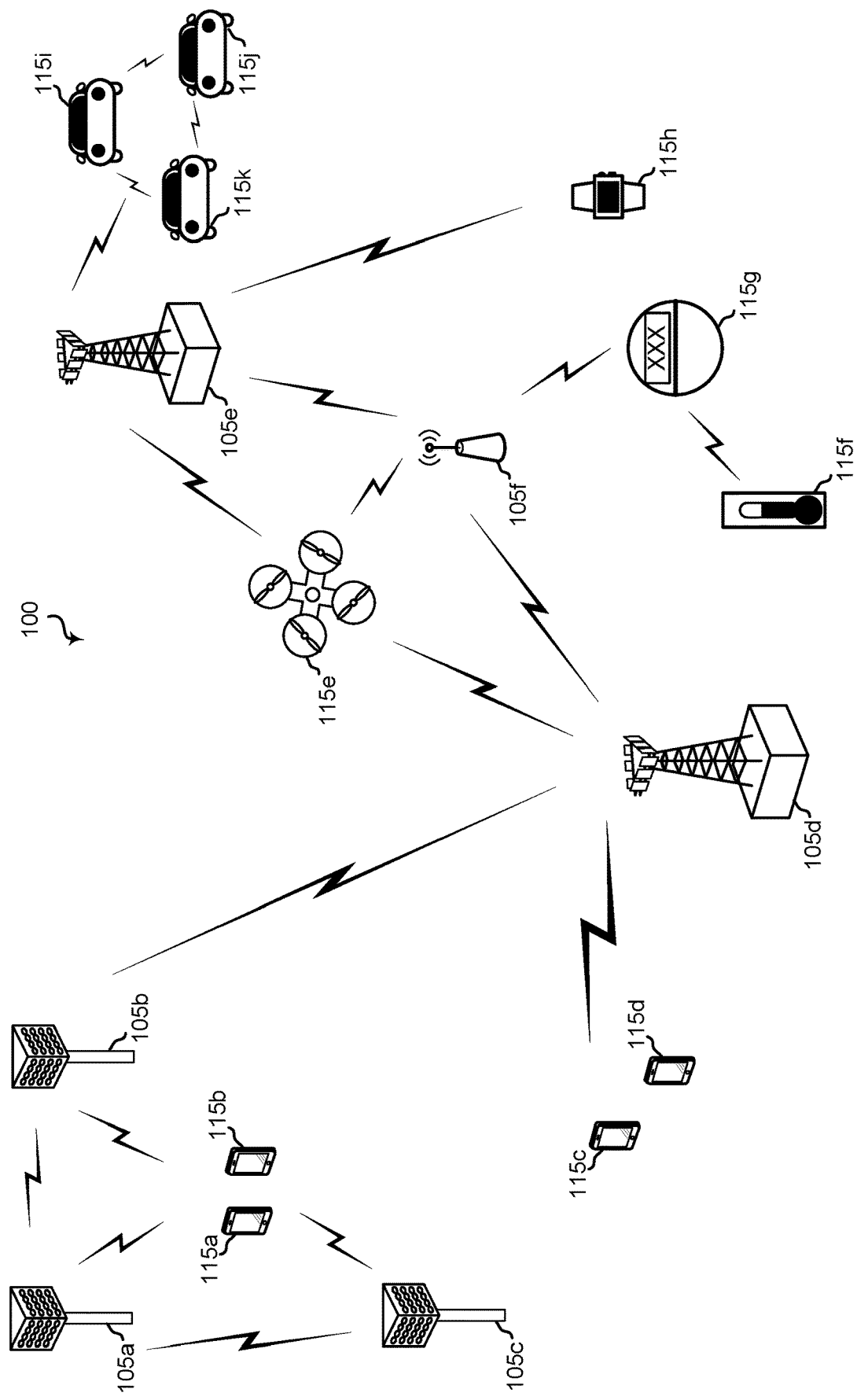
FIG. 1 is a block diagram illustrating details of a wireless communication system according to some embodiments of the present disclosure.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allows transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g., RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base station 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multi-point (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
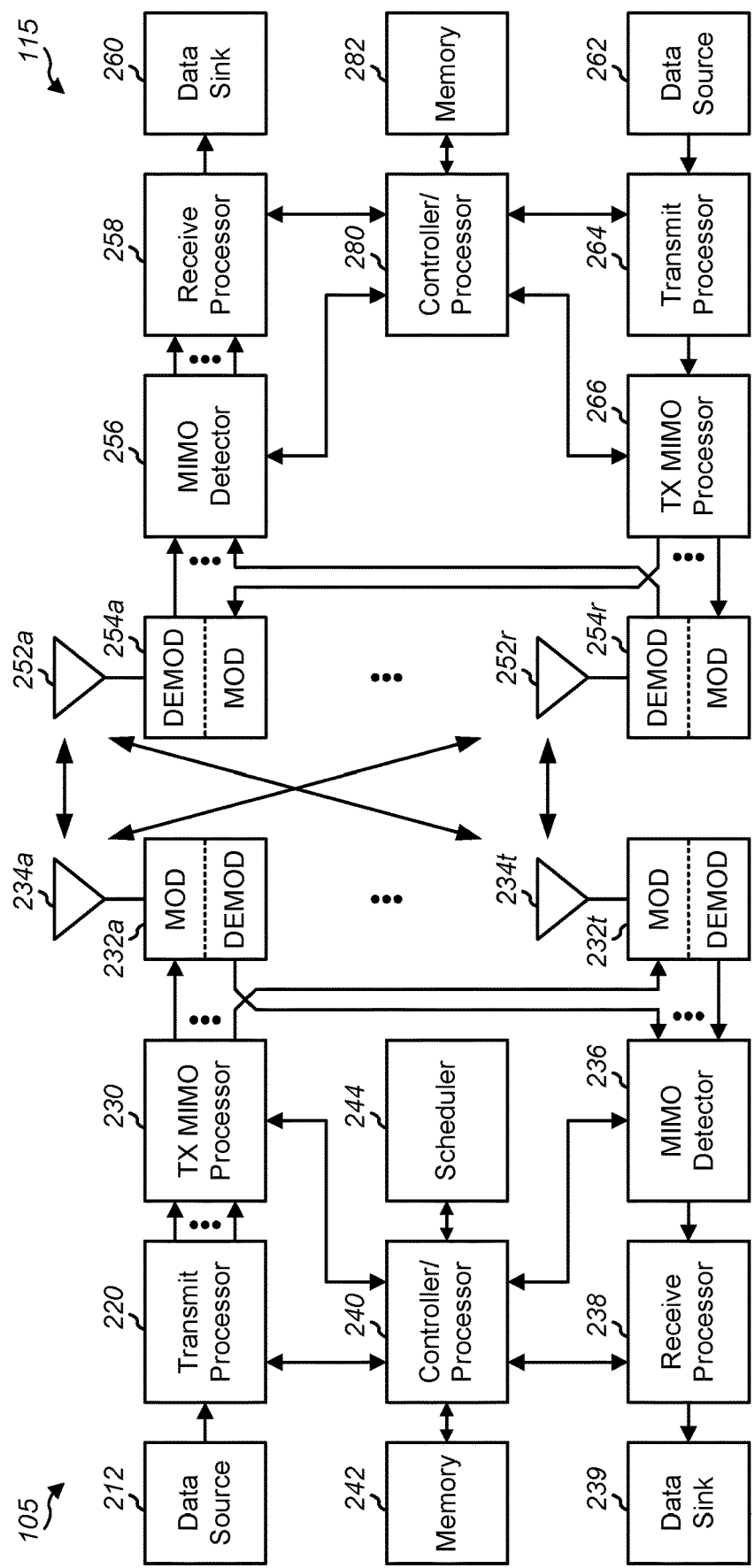
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115D operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 7-8, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

As described above, wireless network 100 may facilitate calls between a source and a remote third party using various protocols. It is becoming more common to utilize data network-based, e.g., Internet protocol (IP) based, resources of wireless network 100 to facilitate calls such as voice calls, video-based calls, or other multimedia-based communication sessions. Such calls may utilize an IP Multimedia Subsystem (IMS) functioning on wireless network 100. Wireless network 100 may also be configured to utilize various signaling methods, such as Session Initiation Protocol (SIP) for initiating, maintaining, and terminating realtime sessions that include voice, video and messaging applications. SIP is generally used for signaling and controlling multimedia communication sessions in applications of Internet telephony for voice and video calls, in private IP telephone systems, in instant messaging over Internet Protocol (IP) networks as well as mobile phone calling over LTE (VoLTE). The protocol defines the specific format of messages exchanged and the sequence of communications for cooperation of the participants.

SIP may work in conjunction with several other protocols that specify and carry the session media. For example, media type and parameter negotiation and media setup are performed with the Session Description Protocol (SDP), which is carried as payload in SIP messages. SIP is designed to be independent of the underlying transport layer protocol, and can be used with the User Datagram Protocol (UDP), the Transmission Control Protocol (TCP), and the Stream Control Transmission Protocol (SCTP). For secure transmissions of SIP messages over insecure network links, the protocol may be encrypted with Transport Layer Security (TLS). For the transmission of media streams (voice, video) the SDP payload carried in SIP messages typically employs the Real-time Transport Protocol (RTP) or the Secure Real-time Transport Protocol (SRTP).

Wireless network 100 may support establishing a call between a UE 115 and a device corresponding to a remote third party. It is understood that a third party device may include any device that is configured to receive or initiate a call where the UE 115 is utilizing a data network-based resources to conduct the call, e.g., an IP-based call. For example, the third party device may be another UE 115 communicating within wireless communications system 100, an internet-connected device located in another location, a land line, and the like.

In accordance with aspects of the disclosure, wireless network 100 may be configured to transfer a call established between a first UE 115 and a third party, to be established to be between a second UE 115 and the remote third party. For example, a user of a smart phone-type device, e.g., UE 115a-115d, may desire to transfer an ongoing call between the user's smart phone and the user's vehicle, e.g., UE 115i-115k.

It is appreciated that allowing for such functionality may expose a user to security vulnerabilities. For example, assume the smart phone UE 115a is being used by a first user to make a voice call through the IMS stack to a third party. When a second user enters a vehicle UE 115k whose profile matches with the first user of smartphone UE 115a but at the moment smart phone UE 115a is in completely different location and being used by someone else; e.g., family member, the second user attempts to pull the call to the car modem. The existing conversation from smart phone UE 115a will be transferred to vehicle UE 115k without the knowledge of the first user who is currently far away. There is a possibility that the first user is having a confidential conversation with the third party when the call was pulled. This call will be inadvertently transferred to vehicle UE 115k, thereby creating a security vulnerability.

To prevent the above-mentioned security vulnerability in a call pull or call push execution, aspects of the disclosure may configure wireless network 100 to utilize a UE assisted proximity-based solution. For example, at the beginning of a call-push or call-pull execution, a network entity facilitating the push/pull execution, such as base station 105, may obtain and/or calculate proximity values for the involved UEs, such as UE 115a and UE 115k. In one aspect, the proximity information may be geo-location information which may be utilized by base station 105 to calculate a radial distance/proximity between the respective UEs. When the calculated proximity is within a pre-defined threshold value, the base station 105 may allow the call-pull or call-push execution. Conversely, when the calculated proximity is greater than a pre-defined threshold value, the call-pull or call-push execution will not be allowed.

In some aspects, UE 115 may be configured to include one or more settings to configure UE 115 to implement call-pull and call-push operations. For example, UE 115 may be configured to include one or more settings to provide permissions to allow for and/or assist with call-pull and call-push operations. Specifically, UE 115 may have an enable/disable setting which instructs onboard processing devices (e.g., controller/processor 280) to allow or disallow a push or pull request to be processed. Further, UE 115 may be configured to assist with the execution of a call-push or call-pull process, e.g., by providing one or more of location data, call data, device data, and the like when a call transfer is being implemented by wireless network 100.

The following provides one or more examples of the implementation of a call-push or call-pull execution in accordance with various aspects of the disclosure. It is appreciated that a call transfers (push or pull) described herein may be implemented between a first and second smart phone, between a smart phone and a vehicle, or between any other UE devices capable of handling an IP-based call session and implementing the signaling described herein. Any reference to particular UE devices while describing these techniques are made for the sake of providing an example and are not intended to be limiting.

Figure 3:
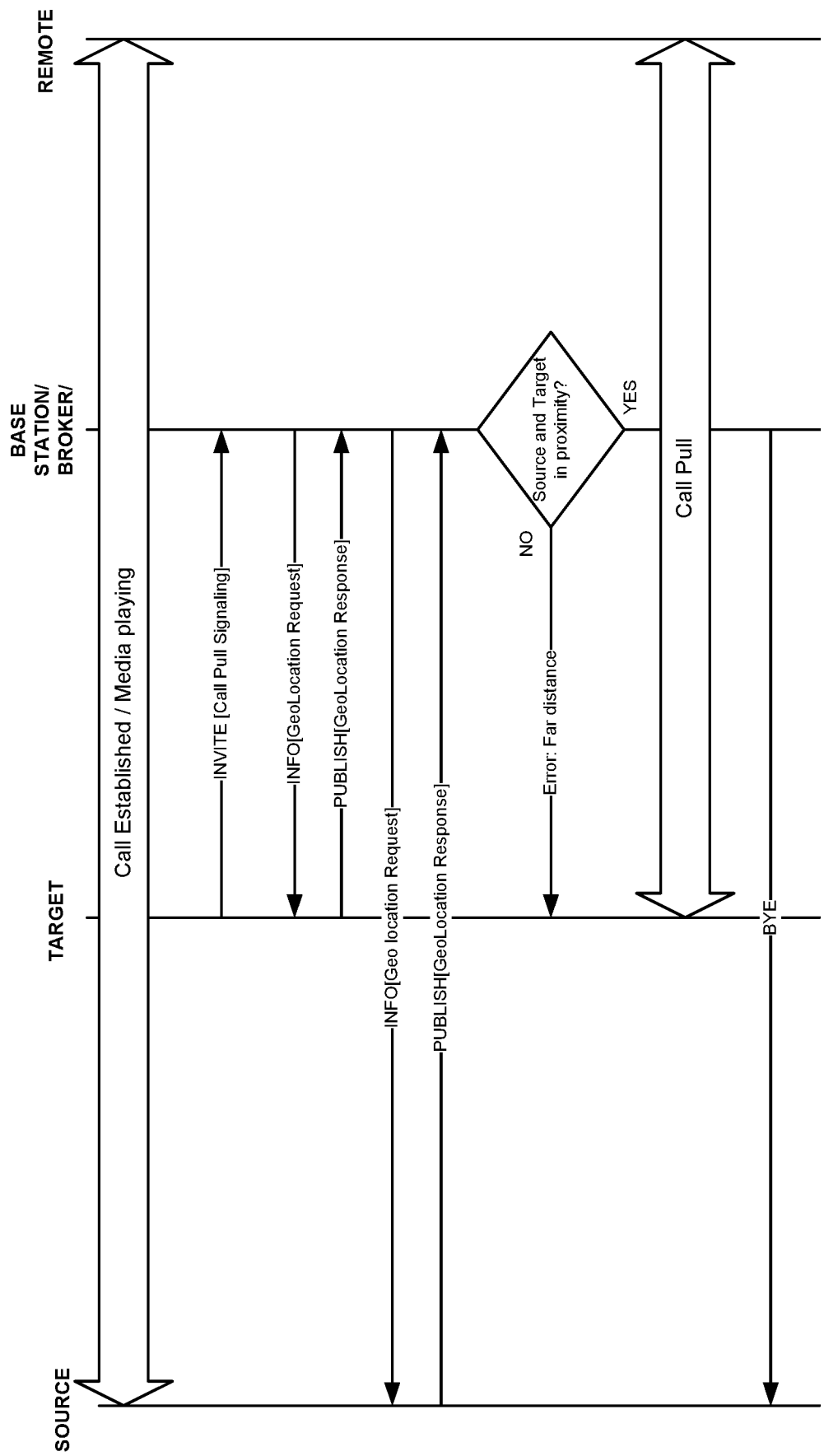
FIG. 3 is a signaling flow diagram illustrating a pull-based call transfer between a source and a target UE according to some embodiments of the present disclosure.

FIG. 3 is a signaling flow diagram illustrating a pull-based call transfer between a source UE and a target UE according to one aspect of the present disclosure. In some aspects the signaling illustrated in this figure is carried out using IMS/SIP signaling, however, and signaling methodology capable of implementing the following can be utilized. It is also understood that the signaling order illustrated does not imply that a specific order is necessary. In fact, some signaling may be implemented simultaneously and some may not be necessary as illustrated below.

Starting at the top arrow, a call is established between a first UE, e.g., UE 115c, and a remote third party device. During the call a target UE, e.g., UE 115i, makes an INVITE request to a broker operating on a base station 105. It is appreciated that the broker functionality described herein may be implemented on a base station, via multiple base stations, and/or a separate device operating on wireless network 100 that may be in communication with base station 105. In this example, the broker is operating on base station 105. The INVITE request is an invitation to pull the call from UE 115c to target UE 115i. The broker then determines whether the call-pull function should be implemented. This may include making an INFO request for geo-location information of target UE 115i and source UE 115c which is sent back to the broker in a PUBLISH signal from the source and target UEs. In some aspects the broker may not need to request location data from target UE 115i, as the location data could be provided with the INVITE request.

With the location information, the broker determines whether the source UE 115c and target UE 115i are in proximity to each other. Determining whether the UEs are in proximity may include calculating a radial distance between source UE 115c and target UE 115i based on the location data received and comparing the calculated radial distance to a predetermined proximity threshold. If the radial distance is greater than the predetermined proximity threshold, the respective UEs are determined to not be in proximity. Alternatively, if the radial distance is within the predetermined proximity threshold, the respective UEs are determined to be in proximity.

The level to set the predetermined proximity threshold may depend on various factors, e.g., the type of location data being received, the level of certainty desired, the location of wireless network 100, etc. For example, GPS data is only accurate within a certain distance, and that level of accuracy may be different in different locations (such as in large cities versus rural areas). The level of accuracy may dictate using a higher threshold to allow for various tolerance. Conversely, the smaller the threshold, the more likely that a call-push or call-pull operation is legitimate.

In the event that the broker determines that the source UE 115c and target UE 115i are not in proximity, the broker sends an Error signal to target UE 115c which indicates that the pull request will not be executed. In the event that the broker determines that the source UE 115c and target UE 115i are in proximity then the broker executes the call-pull operation to establish the call to be between target UE 115i and the remote third party. The broker may also send a control signal BYE to source UE 115c to disconnect the call from source UE 115c once the call is established at target UE 115i.

Figure 4:
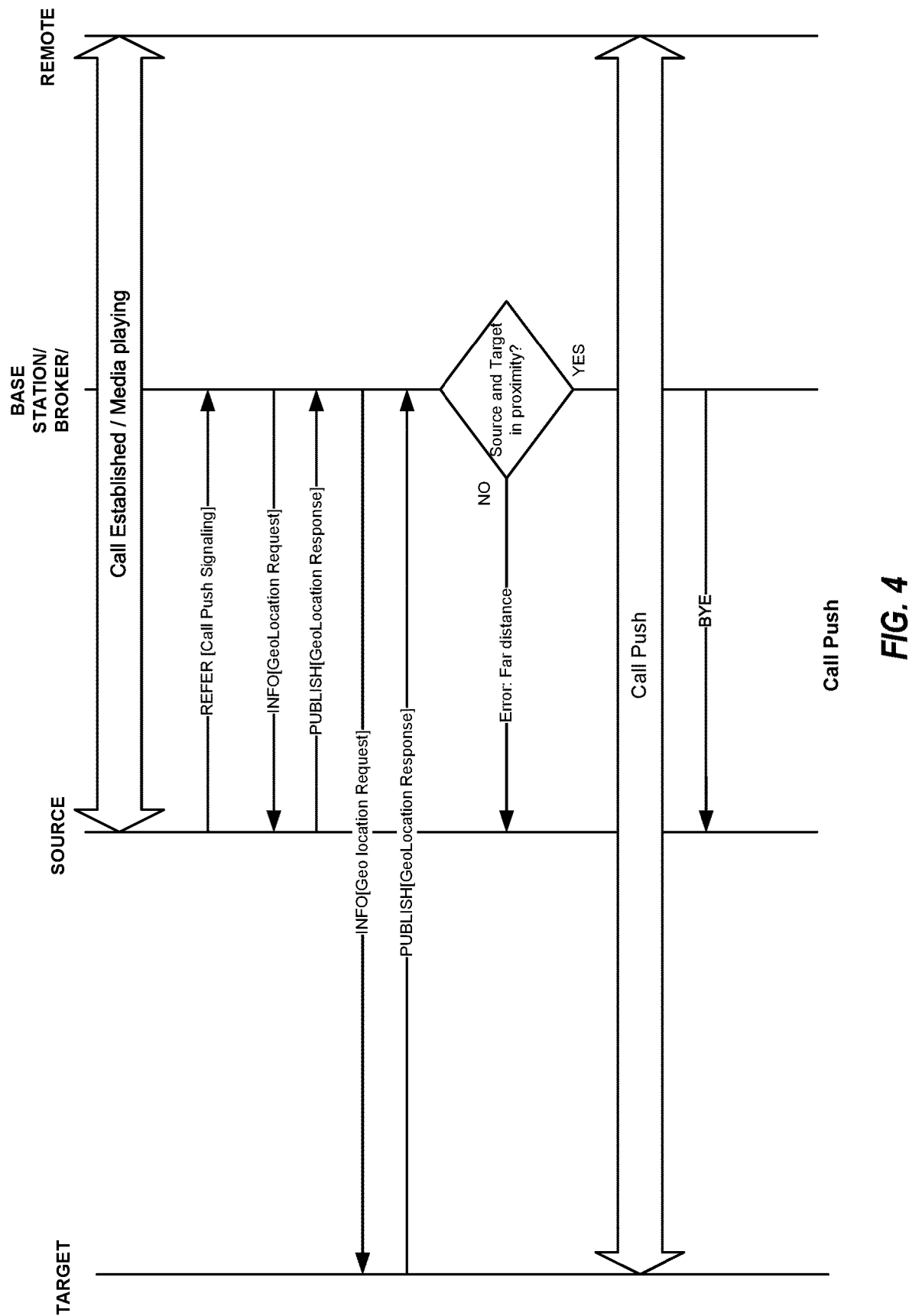
FIG. 4 is a signaling flow diagram illustrating a push-based call transfer between a source and a target UE according to some embodiments of the present disclosure.

FIG. 4 is a signaling flow diagram illustrating a push-based call transfer between a source UE and a target UE according to one aspect of the present disclosure. In some aspects the signaling illustrated in this figure is carried out using IMS/SIP signaling, however, and signaling methodology capable of implementing the following can be utilized. It is also understood that the signaling order illustrated does not imply that a specific order is necessary. In fact, and some signaling may be implemented simultaneously and some may not be necessary as illustrated below.

Starting at the top arrow, a call is established between a first UE, e.g., UE 115b, and a remote third party device. During the call source UE 115b makes a REFER request to a broker operating on a base station 105. As with the example above, it is appreciated that the broker functionality described herein may be implemented on a base station, via multiple base stations, and/or a separate device operating on wireless network 100 that may be in communication with base station 105. In this example, the broker is operating on base station 105. The REFER request is an invitation to push the call from UE 115b to a target UE, e.g., UE 115j. The broker then determines whether the call-push function should be implemented. This may include making an INFO request for geo-location information of target UE 115j and source UE 115b which is sent back to the broker in a PUBLISH signal from the source and target UEs. In some aspects the broker may not need to request location data from source UE 115b, as the location data could be provided with the REFER request.

With the location information, the broker determines whether the source UE 115b and target UE 115j are in proximity to each other. Determining whether the UEs are in proximity may include calculating a radial distance between source UE 115b and target UE 115j based on the location data received and comparing the calculated radial distance to a predetermined proximity threshold. If the radial distance is greater than the predetermined proximity threshold, the respective UEs are determined to not be in proximity. Alternatively, if the radial distance is within the predetermined proximity threshold, the respective UEs are determined to be in proximity.

As with the above, the level to set the predetermined proximity threshold may depend on various factors, e.g., the type of location data being received, the level of certainty desired, the location of wireless network 100, etc. For example, GPS data is only accurate within a certain distance, and that level of accuracy may be different in different locations (such as in large cities versus rural areas). The level of accuracy may dictate using a higher threshold to allow for various tolerance. Conversely, the smaller the threshold, the more likely that a call-push or call-pull operation is legitimate.

In the event that the broker determines that the source UE 115b and target UE 115j are not in proximity, the broker sends an Error signal to source UE 115b which indicates that the push request will not be executed. In the event that the broker determines that the source UE 115b and target UE 115j are in proximity then the broker executes the call-push operation to establish the call to be between target UE 115j and the remote third party. The broker may also send a control signal BYE to source UE 115b to disconnect the call from source UE 115b once the call is established at target UE 115j.

Figure 5:
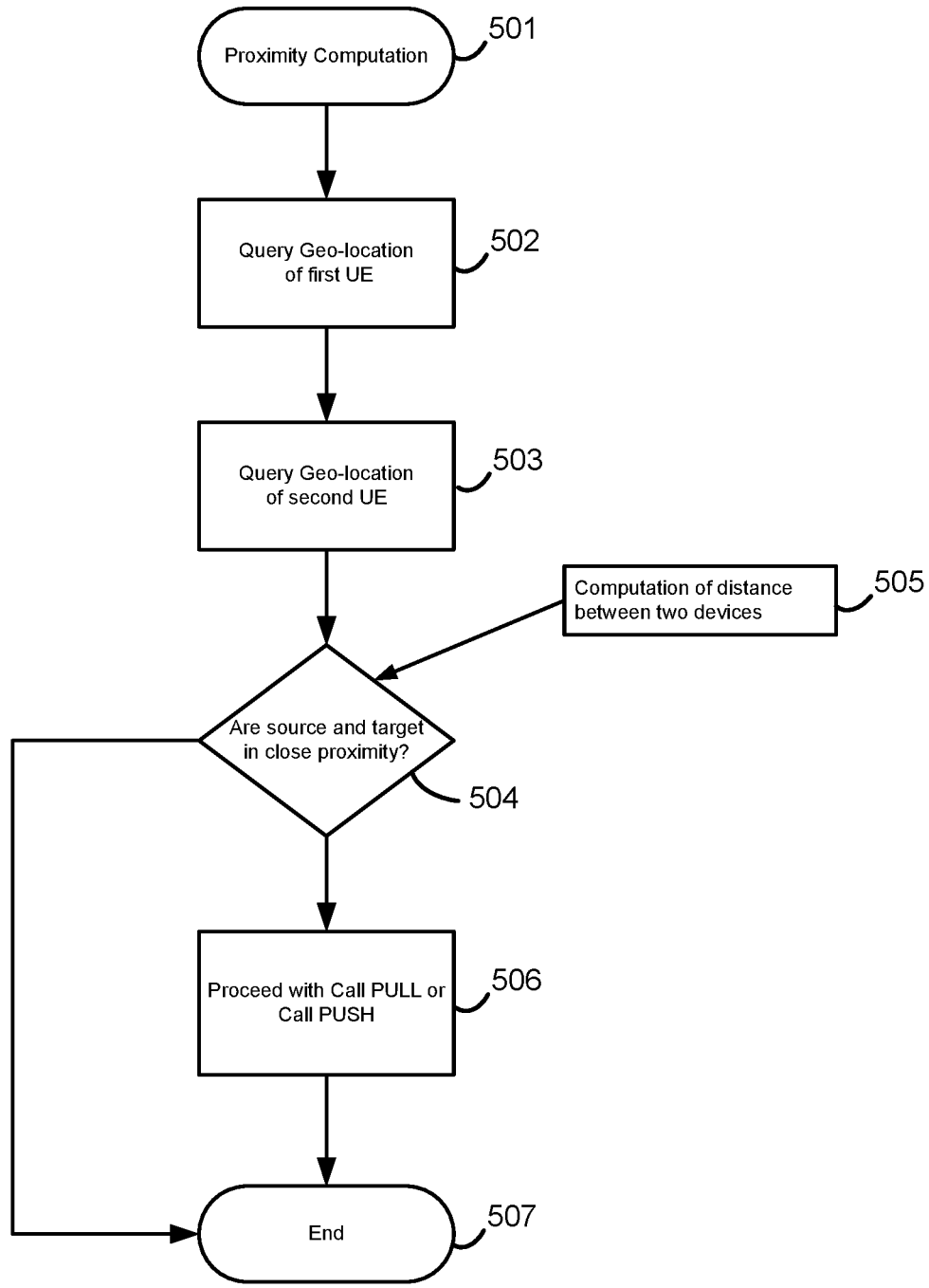
FIG. 5 is a flow diagram illustrating a proximity computation process to determine whether a call transfer is implemented according to some embodiments of the present disclosure.

FIG. 5 is a flow diagram illustrating a proximity computation process 500 to determine whether a call transfer is implemented according to some aspects of the present disclosure. When a base station/broker determines that a proximity computation is needed at block 501, the base station may query a first UE (the UE requesting a pull or push operation) to determine the UE's geo-location at block 502. The base station may also query a second UE to determine its geo-location at block 503. At block 504, the base station determines whether the first and second UEs are in close proximity using the queried location data and the results of a distance computation between devices carried out at block 505. As described above, a determination of whether devices are within a close proximity may include comparing a calculated distance between devices to a predetermined threshold value. Such a value may be set according to conditions appropriate for the wireless network to provide for security and reliability of the process (e.g., to account for a margin of error for distance calculations and to allow the threshold to be close enough to provide sufficient certainty that the transfer is legitimate). In the event that it is determined at block 504 that the first and second UE are in close proximity, the process will proceed to block 506 and the base station will proceed with the call-push or call-pull operation and will end process 500 at block 507. If it is determined at block 504 that the first and second UE are not in close proximity, process 500 will proceed to end at block 507.

Figure 6:
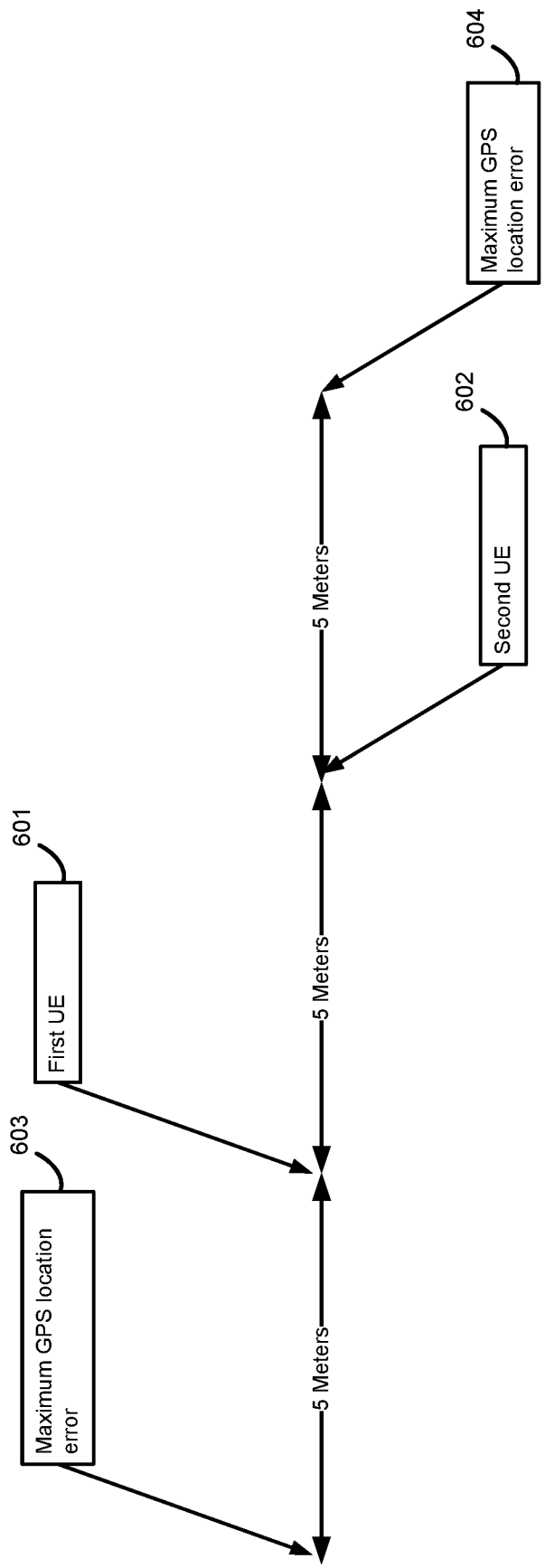
FIG. 6 illustrates an example proximity determination scenario according to some embodiments of the present disclosure.

FIG. 6 illustrates an example proximity determination scenario according to aspects of the present disclosure. In this example, proximity threshold values and margins of error are illustrated using GPS-type location information. It is appreciated that other forms of location data may be obtained and utilized in accordance with various aspects. The following discussion which utilizes GPS information is provided by way of example.

It is understood that GPS location is mostly reliable with conservative estimate of accuracy with-in the range of +/−3 meters and worst case +/−5 meters. This accuracy may also be dependent on the location of a device. For example, in an area where a mobile phone is in a high-rise building or in an urban area, the margin of error could be on the larger end. Additionally, some areas have artificially reduced GPS resolution, e.g., for security purposes. Accordingly, aspects may define proximity to be different among different locations. In the illustrated example, 5 meters distance is declared as "Proximity", and with a +/−5 meter accuracy rating, the computation will account for an error of 10 Meters. Hence the total Maximum distance between a first UE and a second UE should be less than or equal to a threshold value of 15 meters. This is shown in FIG. 6 where the location of first UE 601 is 5 meters apart from the location of second UE 602. The maximum GPS location error for first UE could be at 603 and the maximum GPS location error for second UE could be at 605. Therefore, a 15 meter distance could be measured when 5 meters is set as a desired distance. It is appreciated that this is just an example of how proximity could be computed using GPS-based geo-location servers. In another example, error range may be set to +/−3 meters, which would allow for a maximum threshold of an 11 meter difference. In other aspects, proximity may be defined as a larger or smaller distance (e.g., 3 meters, 10 meters, etc.) while also accounting for resolution errors.

FIG. 7 shows a flow diagram 700 for operation by devices in a wireless network facilitating proximity-based call transfers according to aspects of the present disclosure. The functions of flow 700 may, for example, be performed by various devices in the network (e.g., one or more base stations 105) for facilitating proximity determinations and call-pull or call-push signaling and operations.

At block 701 of example flow 700, a request from a first user equipment (UE) to transfer a call, established between the first UE and a third party device, to be between a second UE and the third party device, may be received. The established call may be a call which utilizes an Internet Protocol-based connection between the first UE operating on wireless network 100 and the third party device. In one aspect, this request may be a pull request from the second UE to pull an established call to the second UE from the first UE. In another aspect, this request may be a push request from the first UE to push the established call from the first UE to the second UE.

At block 702 of example flow 700, location information for the first and the second UE is received. In one aspect, the location information may include global positioning system (GPS) location information. Additionally, in one aspect, a location information request query may be transmitted by base station 105 prior to receiving the information. This query may be sent to both the first and second UE. Additionally, the query may be sent to only the second UE in instances where the request to transfer the call included location information from the first UE.

At block 703 of example flow 700, the base station may determine whether the first and second UE are in proximity to each other. As described above, aspects may utilize a predetermined threshold value to compare with a radial distance measurement between the first UE and second UE. For example, one aspect may consider a distance of 5 meters to be in proximity. Further, when accounting for resolution errors of the location data, e.g., +/−5 meters, a threshold value may be set at 15 meters. Therefore, if the distance between the first UE and second UE is less than or equal to 15 meters, the base station would determine that the UEs are in proximity. It is understood, and as discussed above, such distances and thresholds may be set at various levels depending on conditions of the network, locations, type of location data, and the like.

At block 704 of example flow 700, in the event that a determination is made that the first and second UE are in proximity to each other, the base station causes the established call to be transferred from the first UE to the second UE. In this example flow, base station 105 has implemented a UE-assisted call transfer that has an added level of security because it can be reasonably known that the user of the first UE is in proximity with the second UE. Hence, a user is less likely to have a call improperly taken from them. Additionally, as described above, base station 105 may utilize any signaling protocol that is functional to facilitate the above information exchange and call transfers. And in one aspect, base station 105 utilizes SIP signaling to transfer the established call from the first UE to the second UE.

FIG. 8 shows a flow diagram 800 for operation by devices in a wireless network facilitating proximity-based call transfers according to embodiments of the present disclosure. The functions of flow 800 may, for example, be performed by various devices in the network (e.g., one or more UEs 115) for facilitating proximity based and call-pull or call-push signaling and operations.

At block 801 of example flow 800, a first user equipment (UE) may initiate a call transfer request to transfer a call established between one of the first or a second UE and a remote third party, to be between a the other of the first or the second UE and the remote third party. For example, the call transfer request by the first UE may be a pull request to pull a call established between the second UE and the remote third party to be between the first UE and the remote third party. Additionally, the call transfer request by the first UE may be a push request to push a call established between the first UE and the remote third party, to be between the second UE and the remote third party.

At block 802 of example flow 800, the first UE may provide location information of the first UE to a base station. This location information may be provided with the transfer request. In another aspect, the location information may be provided in response to a query from a base station, such as base station 105. The location information may include any information which provides the geo-location of the first UE, e.g., GPS location information.

At block 803 of example flow 800, the first UE may receive a notification indicating whether the call transfer request is granted. Further, at block 804, the first UE may execute one or more transfer processes in response to receiving a granted transfer request notification. In the event that the first UE is making a call-pull request that is granted, conducting one or more transfer processes may include receiving and facilitating the pulled call by the first UE. If the call-pull request is denied, the first UE may return to an idle state. In the event that the first UE is making a call-push request that is granted, conducting one or more transfer processes may include disconnecting the established call by the first UE once it is transferred to the second UE. If the call-push request is denied, the first UE may continue implementing the established call.

Figure 9:
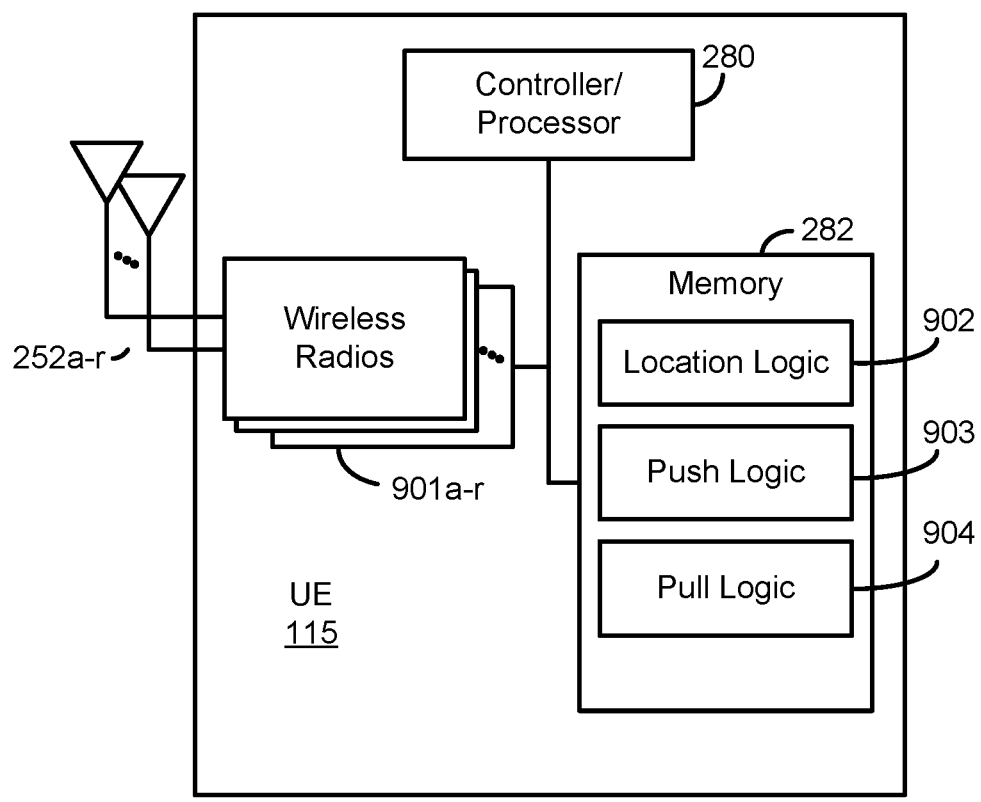
FIG. 9 is a block diagram conceptually illustrating a design of a UE configured to facilitate a call transfer operation according to some embodiments of the present disclosure.

FIG. 9 is a block diagram conceptually illustrating a design of a UE 115 configured to facilitate a call transfer operation according to some embodiments of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 901a-r and antennas 252a-r. Wireless radios 901a-r include various components and hardware, as illustrated in FIG. 2 for UE 115, including modulator/demodulators 254a-r, MIMO detector 256, receive processor 258, transmit processor 264, and TX MIMO processor 266.

One or more algorithms stored by the memory 282 configure processor/controller 280, transmit processor 264, and/or receive processor 258 to carry out one or more procedures relating to wireless communication by UE 115, as previously described. For example, UE-assisted call-push or call-pull transfers may be implemented between a first UE 115 and a second UE 115 operating on wireless network 100 using one or more of location logic 902, push logic 903 and pull logic 904 to implement various functionality. For example, when making a transfer request, or in response to a query from base station 105, location logic 902 may operate to poll location resources of UE 115 and provide geo-location data to base station 105.

Push logic 903 may operate to provide requisite signaling to base station 105 to initiate a push operation/request to push an established call from UE 115 to a second UE. Push logic 903 may also cause location logic 902 execute processes to poll location data and transmit the same to base station 105. Additionally, upon a determination that the push operation/request is granted by base station 105, push logic 903 may further function to disconnect the call at UE 115 in response to signaling from base station 105 that indicates that the call has been successfully pushed to the second UE.

Pull logic 904 may operate to provide requisite signaling to base station 105 to initiate a call-pull operation/request to pull an established call to UE 115 from a second UE. Pull logic 904 may also cause location logic 902 execute processes to poll location data and transmit the same to base station 105. Additionally, upon a determination that the pull operation/request is granted by base station 105, pull logic 904 may further function to establish the call at UE 115 in response to signaling from base station 105 that indicates that the call-pull request has been granted. Call pull logic 904 may further generate and send an acknowledgment signal to base station 105 that indicates that the pulled call is established.

Call push logic 903 and/or call pull logic 904 may be further configured to establish a setting, or to determine the state of a setting, which indicates whether call push transfer capability is enabled on UE 115. In the event that the setting is enabled, call-push logic 903 and call-pull logic 904 functions to facilitate the transfer as described above. Conversely, in the event that the setting is disabled, call-push logic 903 and call pull logic 904 may function to prevent any call transfer.

Figure 10:
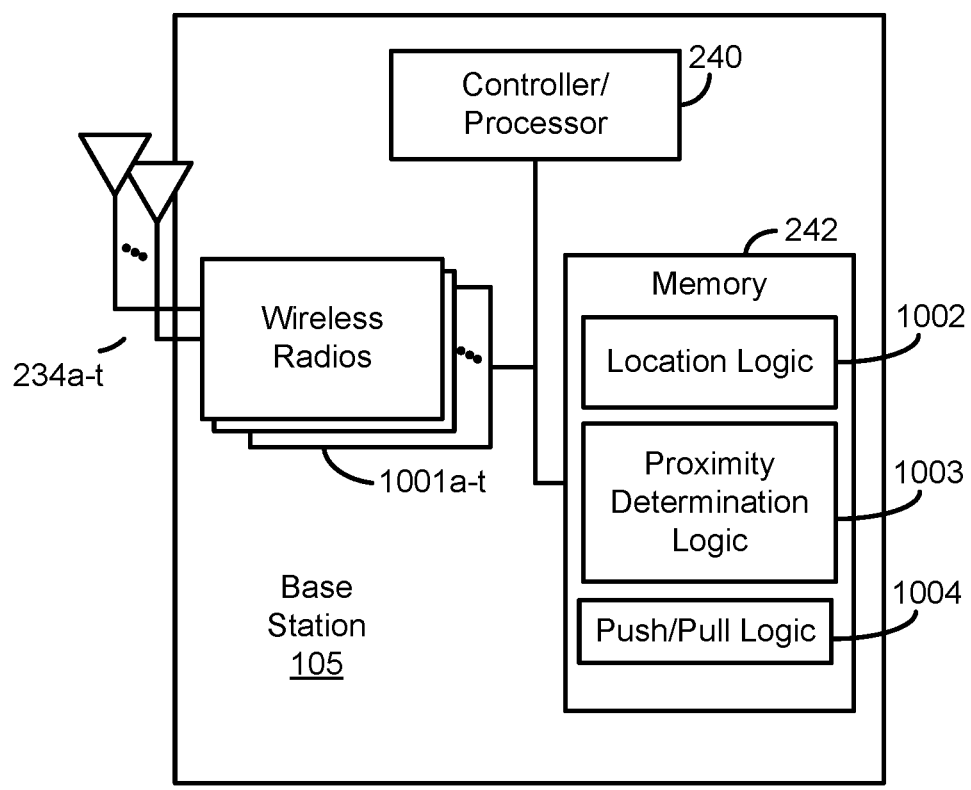
FIG. 10 is a block diagram conceptually illustrating a design of a base station configured to facilitate a call transfer operation according to some embodiments of the present disclosure.

FIG. 10 is a block diagram conceptually illustrating a design of a base station configured to facilitate a call transfer operation according to some embodiments of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1001a-t and antennas 234a-t. Wireless radios 1001a-t include various components and hardware, as illustrated in FIG. 2 for base station 105, including modulator/demodulators 232a-t, MIMO detector 236, receive processor 238, transmit processor 220, and TX MIMO processor 230.

One or more algorithms stored by the memory 242 configure processor/controller 240, transmit processor 220, and/or receive processor 238 to carry out one or more procedures relating to wireless communication by base station 105, as previously described. For example, facilitation a call-push or call-pull functionality by base station 105 may be implemented using one or more of location logic 1002, proximity determination logic 1003, and push/pull logic 1004 to implement various functionality. For example, when a call-pull or call-push request is received at base station 105, push/pull logic 1004 may be configured to recognize the signaling and the source and target UEs. Location logic 1002 may then compile location information from the source and target UEs and provide that information to proximity determination logic 1003. Proximity determination logic 1003 may be adapted to receive location data of a source and target UE and to determine whether the source and target UE are within a threshold radial distance, which may be defined as described in detail above. If the source and target UE are determined to not be within the threshold radial distance, push/pull logic 1004 may deny the request to transfer the call between the source UE and target UE. If the source and target UE are determined to be within the threshold radial distance (e.g., in proximity with one another), push/pull logic 1004 may then function to transmit the requisite signaling to transfer the call, e.g., command one UE to establish the call and provide requisite call information and command the other UE to disconnect the call.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to implementing call-push and call-pull processes using proximity data may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5, 7 and 8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a base station, a request from a first user equipment (UE) to transfer a call, established between the first UE and a third party device, to be between a second UE and the third party device;
   receiving, by the base station, location information for the first and the second UE;
   determining, by the base station, whether the first and second UE are in proximity to each other; and
   in the event that a determination is made that the first and second UE are in proximity to each other, transferring the established call from the first UE to the second UE.

2. The method of claim 1, wherein the call established between the first UE and the third party device is established using an Internet Protocol connection.

3. The method of claim 1, wherein the base station utilizes session initiation protocol signaling to transfer the established call from the first UE to the second UE.

4. The method of claim 1, wherein the location information for the first and second UE includes global positioning system (GPS) location information.

5. The method of claim 1, wherein determining that the first and second UE are in proximity to each other includes determining that the first and second UE are within fifteen meters of each other.

6. The method of claim 1, wherein the request from the first UE is a push request to push the established call from the first UE to the second UE.

7. The method of claim 1, wherein the request from the first UE is a pull request to pull the established call to the first UE from the second UE.

8. An apparatus configured for wireless communication, the apparatus comprising:
   at least one processor; and
   a memory coupled to the at least one processor,
   wherein the at least one processor is configured to:
   receive a request from a first user equipment (UE) to transfer a call, established between the first UE and a third party device, to be between a second UE and the third party device;
   receive location information for the first and the second UE;

determine whether the first and second UE are in proximity to each other; and in the event that a determination is made that the first and second UE are in proximity to each other, transfer the established call from the first UE to the second UE.

9. The apparatus of claim 8, wherein the call established between the first UE and the third party device is established using an Internet Protocol connection.

10. The apparatus of claim 8, wherein the apparatus utilizes session initiation protocol signaling to transfer the established call from the first UE to the second UE.

11. The apparatus of claim 8, wherein the location information for the first and second UE includes global positioning system (GPS) location information.

12. The apparatus of claim 8, wherein determining that the first and second UE are in proximity to each other includes determining that the first and second UE are within fifteen meters of each other.

13. The apparatus of claim 8, wherein the request from the first UE is a push request to push the established call from the first UE to the second UE.

14. The apparatus of claim 8, wherein the request from the first UE is a pull request to pull the established call to the first UE from the second UE.

15. A method of wireless communication, comprising:

initiating, by a first user equipment (UE), a call transfer request to transfer a call established between one of the first or a second UE and a third party device, to be between a the other of the first or the second UE and the third party device;

providing, by the first UE, location information of the first UE to a base station;

receiving, by the first UE, a notification indicating whether the call transfer request is granted; and executing one or more transfer processes by the first UE in response to receiving a granted transfer request notification.

16. The method of claim 15, wherein the call transfer request is a pull request to pull a call established between the second UE and the third party device to be between the first UE and the third party device.

17. The method of claim 16, wherein conducting one or more transfer processes includes receiving and facilitating the pulled call by the first UE.

18. The method of claim 15, wherein the call transfer request is a push request to push a call established between the first UE and the third party device, to be between the second UE and the third party device.

19. The method of claim 18, wherein conducting one or more transfer processes includes disconnecting the established call by the first UE.

20. The method of claim 15, wherein the location information is provided by the first UE with the call transfer request.

21. The method of claim 15, wherein the location information is provided by the first UE to the base station in response to receiving a request from the base station.

22. The method of claim 15, wherein the location information provided by the first UE includes global positioning system (GPS) information.

23. An apparatus configured for wireless communication, the apparatus comprising:

at least one processor; and a memory coupled to the at least one processor, wherein the at least one processor is configured to:

initiate a call transfer request to transfer a call established between one of the first or a second UE and a third party device, to be between a the other of the first or the second UE and the third party device;

provide location information of the first UE to a base station;

receive a notification indicating whether the call transfer request is granted; and execute one or more transfer processes in response to receiving a granted transfer request notification.

24. The apparatus of claim 23, wherein the call transfer request is a pull request to pull a call established between the second UE and the third party device to be between the first UE and the third party device.

25. The apparatus of claim 24, wherein conducting one or more transfer processes includes receiving and facilitating the pulled call by the first UE.

26. The apparatus of claim 23, wherein the call transfer request is a push request to push a call established between the first UE and the third party device, to be between the second UE and the third party device.

27. The apparatus of claim 26, wherein conducting one or more transfer processes includes disconnecting the established call by the first UE.

28. The apparatus of claim 23, wherein the location information is provided by the first UE with the call transfer request.

29. The apparatus of claim 23, wherein the location information is provided by the first UE to the base station in response to receiving a request from the base station.

30. The apparatus of claim 23, wherein the location information provided by the first UE includes global positioning system (GPS) information.

* * * * *